(12) United States Patent
Luo et al.

(10) Patent No.: US 9,882,650 B2
(45) Date of Patent: Jan. 30, 2018

(54) OPTICAL DIFFERENTIAL SIGNAL SENDING METHOD, APPARATUS AND SYSTEM

(71) Applicant: Huawei Technologies Co., Ltd., Shenzhen (CN)

(72) Inventors: Daxin Luo, Beijing (CN); Tongtong Cao, Beijing (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 8 days.

(21) Appl. No.: 15/189,719

(22) Filed: Jun. 22, 2016

(65) Prior Publication Data

US 2016/0301478 A1    Oct. 13, 2016

Related U.S. Application Data

(63) Continuation of application No. PCT/CN2013/090190, filed on Dec. 23, 2013.

(51) Int. Cl.
*H04B 10/00* (2013.01)
*H04B 10/548* (2013.01)
(Continued)

(52) U.S. Cl.
CPC .......... *H04B 10/548* (2013.01); *G02F 1/011* (2013.01); *G02F 1/225* (2013.01); *H04B 10/25* (2013.01);
(Continued)

(58) Field of Classification Search
CPC .... H04B 10/548; H04B 10/25; H04B 10/503; H04B 10/516; H04B 10/677; G02F 1/225; G02F 1/011
(Continued)

(56) References Cited

U.S. PATENT DOCUMENTS

| 4,316,141 A | 2/1982 | Adolfsson et al. |
| 4,764,984 A | 8/1988 | Franke et al. |

(Continued)

FOREIGN PATENT DOCUMENTS

| CN | 1734312 | 2/2006 |
| CN | 101640569 A | 2/2010 |
| WO | 2010132955 A1 | 11/2010 |

*Primary Examiner* — Juan A Torres
(74) *Attorney, Agent, or Firm* — Slater Matsil, LLP (57) ABSTRACT

A system for transmitting optical differential signal includes: an optical source configured to generate two channels of optical signals having different wavelengths; an input end for a to-be-modulated electrical signal configured to input a to-be-modulated electrical signal; a unique optical modulator configured to perform optical modulation on the two channels of optical signals using the to-be-modulated electrical signal, to obtain two channels of modulated optical differential signals; an optical sending unit, configured to send the two channels of modulated optical differential signals to optical transmission media; an optical receiving unit, configured to receive the two channels of optical differential signals; an optical detector, configured to perform optical-to-electrical conversion separately on the two channels of modulated optical differential signals, to obtain two channels of electrical signals; and a comparator configured to perform a differential operation to obtain one channel of electrical signal.

17 Claims, 8 Drawing Sheets

(51) Int. Cl.
*H04B 10/516* (2013.01)
*H04B 10/67* (2013.01)
*G02F 1/01* (2006.01)
*G02F 1/225* (2006.01)
*H04B 10/25* (2013.01)
*H04B 10/50* (2013.01)
*G02F 1/21* (2006.01)

(52) U.S. Cl.
CPC ......... *H04B 10/503* (2013.01); *H04B 10/516* (2013.01); *H04B 10/677* (2013.01); *G02F 2001/212* (2013.01)

(58) Field of Classification Search
USPC .......................................................... 398/194
See application file for complete search history.

(56) References Cited

U.S. PATENT DOCUMENTS

| | | | |
|---|---|---|---|
| 4,878,726 A * | 11/1989 | Fatehi | H04B 10/032 385/16 |
| 5,105,293 A | 4/1992 | Bortolini | |
| 7,088,885 B1 * | 8/2006 | Wang | H04B 10/2587 385/15 |
| 2003/0174386 A1 * | 9/2003 | Oikawa | H04B 10/2543 359/328 |
| 2005/0265728 A1 | 12/2005 | Yao | |
| 2010/0104277 A1 * | 4/2010 | Robinson | H04B 10/5051 398/25 |

\* cited by examiner

OPTICAL DIFFERENTIAL SIGNAL SENDING METHOD, APPARATUS AND SYSTEM

CROSS-REFERENCE TO RELATED APPLICATIONS

This application is a continuation of International Application No. PCT/CN2013/090190, filed on Dec. 23, 2013, which is hereby incorporated by reference in its entirety.

TECHNICAL FIELD

The present disclosure relates to the field of optical interconnection technologies, and in particular, to optical differential signal sending method and apparatus and a system.

BACKGROUND

Problems such as a long delay and low bandwidth of electrical interconnection always restrict development of the fields such as computers and integrated circuits. In recent years, these problems gradually become a bottleneck for rapid development of these fields. Optical interconnection has a tendency to replace the electrical interconnection because of advantages in speed, bandwidth, power consumption, costs, and the like.

However, the optical interconnection technology is not mature yet and has many to-be-resolved problems, for example, thermal noise of a photoelectric detector. As speed increases, a carrier in a modulator of an optical transmitter module cannot move fast enough, and as a result, an extinction ratio (this means, a ratio of optical signal power existing when an optical signal is 1 to optical signal power existing when the optical signal is 0, a greater extinction ratio indicates better signal quality) of an output optical signal is decreased, causing an increase in a bit error rate and finally affecting normal operation of a system.

In the prior art, a common method for resolving the foregoing problem is to add a signal driver module for an input electrical signal, so as to increase a voltage of the electrical signal input into an optical modulator. According to the foregoing method, an extinction ratio of an output optical signal is increased to some degree, and a relatively easily recognizable optical signal is obtained.

The inventor finds, through research on the foregoing implementation solution in the prior art, that the foregoing implementation manner has the following problems.

To increase a voltage of an electrical signal input into an optical modulator, a size of a drive circuit needs to be increased, which not only increases the difficulty in designing the drive circuit but also greatly increases power consumption of conversion from an electrical signal to an optical signal. In addition, the increase in the voltage of the electrical signal also causes an increase in electromagnetic radiation, causing more system noise, and causing much interference to the optical signal during a transmission process.

SUMMARY

Embodiments of the present disclosure provide optical differential signal sending and receiving methods and apparatuses and a system, which can effectively improve anti-interference performance of an optical signal during a transmission process.

An aspect of the embodiments of the present disclosure provides an optical differential signal transmission system, where the system includes: a transmit end, optical transmission media, and a receive end; the transmit end includes: an optical source, an input end for a to-be-modulated electrical signal, an optical modulator, and an optical sending unit; and the receive end includes: an optical receiving unit, an optical detector, and a comparator. The optical source is configured to generate two channels of optical signals having different wavelengths, where the wavelengths are respectively $\lambda_1$ and $\lambda_2$, and $\lambda_1 \neq \lambda_2$. The input end for a to-be-modulated electrical signal is configured to input a to-be-modulated electrical signal. The optical modulator is configured to perform optical modulation separately on the two channels of optical signals having different wavelengths using the to-be-modulated electrical signal, to obtain two channels of modulated optical differential signals. The optical sending unit is configured to send the two channels of modulated optical differential signals to the optical transmission media. The optical transmission media is connected to the transmit end and the receive end, and is configured to transmit the two channels of modulated optical differential signals. The optical receiving unit is configured to receive the two channels of optical differential signals transmitted by the optical transmission media. The optical detector is configured to perform optical-to-electrical conversion separately on the two received channels of modulated optical differential signals, to obtain two channels of electrical signals. The comparator is configured to perform a differential operation on the two channels of electrical signals obtained by the optical detector, to obtain one channel of electrical signal; and output the channel of electrical signal.

Furthermore, the optical modulator may be a Mach-Zehnder interferometer MZI modulator or a micro-ring resonant modulator.

Optionally, when the optical modulator is an MZI modulator, $\lambda_1$ and $\lambda_2$ meet the following constraint conditions:

$$2\pi n * \frac{|L_1 - L_2|}{(2k+1)\pi - \frac{\Delta\Phi}{2}} < \lambda_1 < 2\pi n * \frac{|L_1 - L_2|}{2k\pi - \frac{\Delta\Phi}{2}},$$

and $$2\pi n * \frac{|L_1 - L_2|}{2k\pi - \frac{\Delta\Phi}{2}} < \lambda_2 < 2\pi n * \frac{|L_1 - L_2|}{(2k+1)\pi - \frac{\Delta\Phi}{2}},$$

where $L_1$ and $L_2$ are respectively lengths of two arms of the MZI modulator, $\Delta\Phi$ is a variation between phase differences, between the two arms, existing when a modulated electrical input signal applied in the MZI modulator is at a high level and a low level, n is an effective refractive index of a waveguide in the MZI modulator, n>1, k is an integer, and k≥1.

Optionally, when the optical modulator is a micro-ring resonant modulator, $\lambda_1$ and $\lambda_2$ meet the following constraint conditions:

$$2\pi n * \frac{2\pi R}{\left(2k\pi - \frac{\Delta\Phi}{2}\right)} < \lambda_1 < 2\pi n * \frac{2\pi R}{(2k-1)\pi - \frac{\Delta\Phi}{2}},$$

and $$2\pi n * \frac{2\pi R}{(2k+1)\pi - \frac{\Delta\Phi}{2}} < \lambda_2 < 2\pi n * \frac{2\pi R}{2k\pi - \frac{\Delta\Phi}{2}},$$

where R is a radius of a micro-ring in the micro-ring resonant modulator, n is an effective refractive index of a waveguide in the micro-ring resonant modulator, n>1, $\Delta\Phi$ is a variation between phases, in the micro-ring, existing when a modulated electrical input signal applied in the micro-ring resonant modulator is at a high level and a low level, k is an integer, and K≥1.

Optionally, the transmit end further includes an optical demultiplexer, connected to the optical modulator and configured to perform de-multiplex processing on the two channels of modulated optical differential signals that are obtained by the optical modulator, to obtain two channels of separated optical differential signals; the optical sending unit is configured to send the two channels of separated optical differential signals to the optical transmission media; and the optical transmission media includes two transmission media, respectively configured to transmit the two channels of separated optical differential signals.

Optionally, the optical source includes: two single-wavelength lasers, configured to respectively generate the two channels of optical signals whose wavelengths are respectively $\lambda_1$ and $\lambda_2$; or one multi-wavelength laser, configured to obtain two channels of optical signals using a beam-splitter, and obtain the two channels of optical signals whose wavelengths are respectively $\lambda_1$ and using two filter lenses for processing, where output wavelengths of the two filter lenses are respectively $\lambda_1$ and $\lambda_2$.

Optionally, the sending end may further include a multiplexer, connected to the optical source and configured to perform multiplex processing on the two generated channels of optical signals whose wavelengths are respectively $\lambda_1$ and $\lambda_2$, and send one obtained channel of optical signal to the optical modulator.

Optionally, the transmission system further includes an optical buffer, connected to the optical detector and configured to perform optical buffering on an optical differential signal, whose transmission speed is faster in the optical transmission media, of the two channels of separated optical differential signals, and send the optical differential signal on which optical buffering processing has been performed and the other optical differential signal of the two channels of separated optical differential signals to the optical detector.

Another aspect of the embodiments of the present disclosure provides an optical differential signal sending apparatus. The apparatus includes an optical source, configured to generate two channels of optical signals having different wavelengths, where the wavelengths are respectively $\lambda_1$ and $\lambda_2$, and $\lambda_1 \neq \lambda_2$. The apparatus also includes an input end for a to-be-modulated electrical signal, configured to input a to-be-modulated electrical signal. The apparatus also includes an optical modulator, configured to perform optical modulation separately on the two channels of optical signals having different wavelengths using the to-be-modulated electrical signal, to obtain two channels of modulated optical differential signals.

The apparatus also includes an optical sending unit, configured to send the two channels of modulated optical differential signals.

Optionally, the optical modulator is a Mach-Zehnder interferometer MZI modulator or a micro-ring resonant modulator.

Optionally, when the optical modulator is an MZI modulator, $\lambda_1$ and $\lambda_2$ meet the following constraint conditions:

$$2\pi n * \frac{|L_1 - L_2|}{(2k+1)\pi - \frac{\Delta\Phi}{2}} < \lambda_1 < 2\pi n * \frac{|L_1 - L_2|}{2k\pi - \frac{\Delta\Phi}{2}}, \text{ and}$$

$$2\pi n * \frac{|L_1 - L_2|}{2k\pi - \frac{\Delta\Phi}{2}} < \lambda_2 < 2\pi n * \frac{|L_1 - L_2|}{(2k-1)\pi - \frac{\Delta\Phi}{2}},$$

where $L_1$ and $L_2$ are respectively lengths of two arms of the MZI modulator, $\Delta\Phi$ is a variation between phase differences, between the two arms, existing when a modulated electrical input signal applied in the MZI modulator is at a high level and a low level, n is an effective refractive index of a waveguide in the MZI modulator, n>1, k is an integer, and K≥1.

Optionally, when the optical modulator is a micro-ring resonant modulator, $\lambda_1$ and $\lambda_2$ meet the following constraint conditions:

$$2\pi n * \frac{2\pi R}{\left(2k\pi - \frac{\Delta\Phi}{2}\right)} < \lambda_1 < 2\pi n * \frac{2\pi R}{(2k-1)\pi - \frac{\Delta\Phi}{2}}, \text{ and}$$

$$2\pi n * \frac{2\pi R}{(2k+1)\pi - \frac{\Delta\Phi}{2}} < \lambda_2 < 2\pi n * \frac{2\pi R}{2k\pi - \frac{\Delta\Phi}{2}},$$

where R is a radius of a micro-ring in the micro-ring resonant modulator, n is an effective refractive index of a waveguide in the micro-ring resonant modulator, n>1, $\Delta\Phi$ is a variation between phases, in the micro-ring, existing when a modulated electrical input signal applied in the micro-ring resonant modulator is at a high level and a low level, k is an integer, and k≥1.

Optionally, the sending apparatus further includes an optical demultiplexer, connected to the optical modulator and configured to perform de-multiplex processing on the two channels of optical differential signals that are obtained by the optical modulator, to obtain two channels of separated optical differential signals, where the optical sending unit is configured to send the two channels of separated optical differential signals.

Optionally, the optical source includes: two single-wavelength lasers, configured to respectively generate the two channels of optical signals whose wavelengths are respectively $\lambda_1$ and $\lambda_2$; or one multi-wavelength laser, configured to obtain two channels of optical signals using a beam-splitter, and obtain the two channels of optical signals whose wavelengths are $\lambda_1$ and $\lambda_2$ using two filter lenses for processing, where output wavelengths of the two filter lenses are respectively $\lambda_1$ and $\lambda_2$.

Optionally, the sending apparatus further includes: an optical multiplexer, connected to the optical source and configured to perform multiplex processing on the two channels of optical signals that are generated by the optical source and whose wavelengths are respectively $\lambda_1$ and $\lambda_2$, and send one obtained channel of optical signal to the optical modulator.

Another aspect of the embodiments of the present disclosure provides an optical differential signal receiving apparatus, where the receiving apparatus includes: an optical receiving unit, configured to receive two channels of optical differential signals transmitted by optical transmission media; an optical detector, configured to perform optical-to-electrical conversion separately on the two received channels of modulated optical differential signals, to obtain two channels of electrical signals; and a comparator, configured to perform a differential operation on the two obtained channels of electrical signals, to obtain one channel of electrical signal; and output the channel of electrical signal.

Optionally, the receiving apparatus further includes an optical buffer, connected to the optical detector and configured to perform optical buffering on an optical differential signal, whose transmission speed is faster in the optical transmission media, of the two channels of separated optical differential signals, and send the optical differential signal on which optical buffering processing has been performed and the other optical differential signal of the two channels of separated optical differential signals to the optical detector.

Another aspect of the embodiments of the present disclosure provides an optical differential signal sending method, including: generating two channels of optical signals having different wavelengths using an optical source, where the wavelengths are respectively $\lambda_1$ and $\lambda_2$, and $\lambda_1 \neq \lambda_2$; performing optical modulation separately on the two channels of optical signals having different wavelengths using a to-be-modulated electrical signal, to obtain two channels of modulated optical differential signals; and sending the two channels of optical differential signals to a receive end.

Optionally, optical modulation may be performed on the to-be-modulated electrical signal using a Mach-Zehnder interferometer MZI modulator or a micro-ring resonant modulator.

Optionally, when optical modulation is performed on the to-be-modulated electrical signal using the MZI modulator, $\lambda_1$ and $\lambda_2$ need to meet the following constraint conditions:

$$2\pi n * \frac{|L_1 - L_2|}{(2k+1)\pi - \frac{\Delta\Phi}{2}} < \lambda_1 < 2\pi n * \frac{|L_1 - L_2|}{2k\pi - \frac{\Delta\Phi}{2}}, \text{ and}$$

$$2\pi n * \frac{|L_1 - L_2|}{2k\pi - \frac{\Delta\Phi}{2}} < \lambda_2 < 2\pi n * \frac{|L_1 - L_2|}{(2k-1)\pi - \frac{\Delta\Phi}{2}},$$

where $L_1$ and $L_2$ are respectively lengths of two arms of the MZI modulator, $\Delta\Phi$ is a variation between phase differences, between the two arms, existing when a modulated electrical input signal applied in the MZI modulator is at a high level and a low level, n is an effective refractive index of a waveguide in the MZI modulator, $n>1$, k is an integer, and $k \geq 1$.

Optionally, when optical modulation is performed on the to-be-modulated electrical signal using the micro-ring resonant modulator, $\lambda_1$ and $\lambda_2$ meet the following constraint conditions:

$$2\pi n * \frac{2\pi R}{\left(2k\pi - \frac{\Delta\Phi}{2}\right)} < \lambda_1 < 2\pi n * \frac{2\pi R}{(2k-1)\pi - \frac{\Delta\Phi}{2}}, \text{ and}$$

$$2\pi n * \frac{2\pi R}{(2k+1)\pi - \frac{\Delta\Phi}{2}} < \lambda_2 < 2\pi n * \frac{2\pi R}{2k\pi - \frac{\Delta\Phi}{2}},$$

where R is a radius of a micro-ring in the micro-ring resonant modulator, n is an effective refractive index of a waveguide in the micro-ring resonant modulator, $n>1$, $\Delta\Phi$ is a variation between phases, in the micro-ring, existing when a modulated electrical input signal applied in the micro-ring resonant modulator is at a high level and a low level, k is an integer, and $k \geq 1$.

Optionally, the method further includes: performing de-multiplex processing on the two channels of modulated optical differential signals obtained by the optical modulator, to obtain two channels of separated optical differential signals, and sending the two channels of separated optical differential signals.

Another aspect of the embodiments of the present disclosure provides an optical differential signal receiving method, where the method includes: receiving two channels of optical differential signals; performing optical-to-electrical conversion separately on the two received channels of optical differential signals, to obtain two channels of electrical signals; and performing a differential operation on the two obtained channels of electrical signals, to obtain one channel of electrical signal; and outputting the channel of electrical signal.

Optionally, before the performing optical-to-electrical conversion separately on the two received channels of modulated optical differential signals, to obtain two channels of electrical signals, the method further includes: performing optical buffering on an optical differential signal, whose transmission speed is faster in optical transmission media, of the two channels of separated optical differential signals, and performing optical-to-electrical conversion separately on the optical differential signal on which optical buffering processing has been performed and the other optical differential signal of the two channels of separated optical differential signals.

Based on the foregoing technical solutions, according to the optical differential signal sending and receiving methods and apparatuses and the system that are provided in the embodiments of the present disclosure, optical modulation is performed separately on two channels of optical signals having different wavelengths using a to-be-modulated electrical signal, to obtain two channels of optical differential signals, and the two channels of optical differential signals are sent to a receive end; at the receive end, optical-to-electrical conversion is performed on the two received channels of optical differential signals using an optical detector, to obtain two electrical signals, and then the two electrical signals are processed using a comparator, to obtain one channel of electrical signal. According to the foregoing optical differential signal transmission manner, anti-interference performance of an optical signal can be effectively improved during a transmission process, thereby improving quality of signal transmission.

BRIEF DESCRIPTION OF THE DRAWINGS

To describe the technical solutions in the embodiments of the present disclosure more clearly, the following briefly describes the accompanying drawings required for describing the embodiments of the present disclosure.

DETAILED DESCRIPTION OF ILLUSTRATIVE EMBODIMENTS

The following describes the technical solutions in the embodiments of the present disclosure with reference to the accompanying drawings in the embodiments of the present disclosure.

Figure 1:
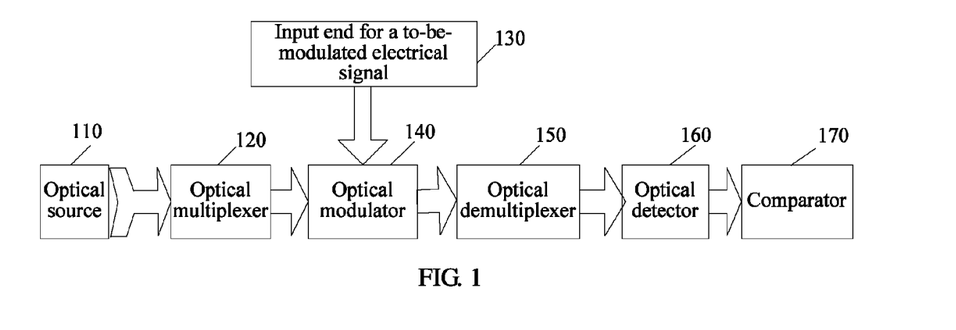
FIG. 1 is a schematic networking diagram of an optical differential signal transmission system according to an embodiment of the present disclosure.

FIG. 1 is a schematic networking block diagram of an optical differential signal transmission system according to the present disclosure, and the transmission system includes an optical source no, an optical multiplexer 120, an input end 130 for a to-be-modulated electrical signal, an optical modulator 140, an optical demultiplexer 150, an optical detector 160, and a comparator 170.

The optical source no is configured to generate two channels of optical signals having different wavelengths, where the wavelengths are respectively $\lambda_1$ and $\lambda_2$. During a specific implementation process, there are at least two implementation manners: one implementation manner is that the optical source may be two single-wavelength lasers, and the two single-wavelength lasers respectively generate the two channels of optical signals having different wavelengths; the other implementation manner is that the optical source may be one multi-wavelength laser that outputs one channel of multi-wavelength optical signal, obtains two channels of multi-wavelength optical signals using a beam-splitter, and obtains the two channels of optical signals having different wavelengths after the two channels of multi-wavelength optical signals respectively pass through two filter lenses having different working wavebands. During a specific implementation process, the forgoing laser may be a semiconductor laser, a solid laser, a gas laser, or the like, which is not limited in any one of the embodiments of the present disclosure.

The optical multiplexer 120 is configured to perform multiplex processing on the two channels of optical signals that have different wavelengths and that are generated by the optical source 110. During specific implementation, the optical multiplexer 120 may be of a diffraction grating type, a prism type, a waveguide type, or the like, which is not limited in any one of the embodiments of the present disclosure.

The input end 130 for a to-be-modulated electrical signal is configured to input a to-be-modulated electrical signal into the optical modulator 140. The electrical signal may be any electrical signal that is sent by a Central Processing Unit (CPU), a memory, a Field-Programmable Gate Array (FPGA) circuit, or the like and that needs to be transmitted through light.

The optical modulator 140 is configured to perform optical modulation separately on the two channels of optical signals having different wavelengths using the electrical signal input from the input end 130 for a to-be-modulated electrical signal, to obtain two channels of modulated optical differential signals. During specific implementation, a Mach-Zehnder Interferometer (MZI) modulator may be used, or a micro-ring resonant modulator may be used. During specific implementation, another modulator may also be used, which is not limited in any one of the embodiments of the present disclosure.

The optical demultiplexer 150 is configured to perform de-multiplex processing on the two channels of modulated optical differential signals, to obtain two channels of separated optical differential signals. The optical demultiplexer may be a diffraction grating type, a prism type, a waveguide type, or the like, which is not limited in any one of the embodiments of the present disclosure.

The optical detector 160 is configured to perform optical-to-electrical conversion separately on the two channels of separated optical differential signals obtained through processing by the optical demultiplexer 150, to obtain two channels of electrical signals.

The comparator 170 is configured to perform a differential operation on the two channels of electrical signals obtained by the optical detector 160, to obtain one channel of electrical signal that is finally output.

During the foregoing optical signal transmission process, a waveguide, a fiber, or free space may be used as a medium for transmitting an optical signal, which is not limited in any one of the embodiments of the present disclosure.

According to the foregoing description, optical modulation is performed on two channels of optical signals having different wavelengths using a to-be-modulated electrical signal, so as to obtain two channels of optical differential signals; at a receive end, optical-to-electrical conversion is performed on the two optical differential signals using an optical detector, and two channels of electrical signals obtained after conversion are processed using a comparator, so as to obtain electrical signals that are finally output. In the foregoing implementation manner, the to-be-modulated electrical signal can be converted into the optical differential signals; generally, interference noise is equally and simultaneously loaded onto the two channels of optical differential signals, and an interference noise difference is 0. Therefore, noise does not have any impact on logic of the two channels of optical differential signals, and the final electrical signals are obtained at the receive end using the comparator, which effectively avoids an impact of environment noise on signal transmission and improves anti-interference performance of an optical signal during a transmission process, thereby improving quality of signal transmission.

To describe an inner structure and an implementation principle of the optical differential signal transmission system more clearly, a description is given using the following specific embodiments.

Figure 2:
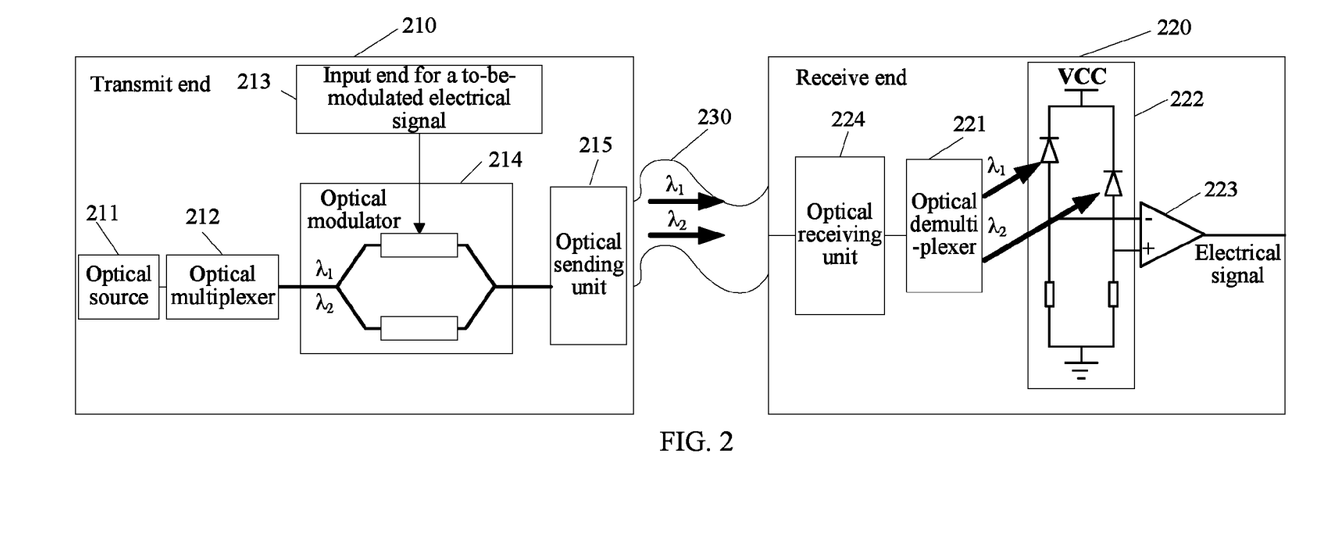
FIG. 2 is a schematic composition diagram of Embodiment 1 of an optical differential signal transmission system according to an embodiment of the present disclosure.

FIG. 2 is a schematic composition diagram of an optical differential signal transmission system. The system includes a transmit end 210, a receive end 220, and optical transmission media 230, where the transmit end 210 includes an optical source 211, an optical multiplexer 212, an input end 213 for a to-be-modulated electrical signal, an optical modulator 214, and an optical sending unit 215.

The optical source 211 is configured to generate two channels of optical signals having different wavelengths, where the wavelengths of the two channels of optical signals are respectively recorded as $\lambda_1$ and $\lambda_2$. A specific implementation manner of the optical source 211 is shown in FIG. 3(a) and FIG. 3(b).

Figure 3A:
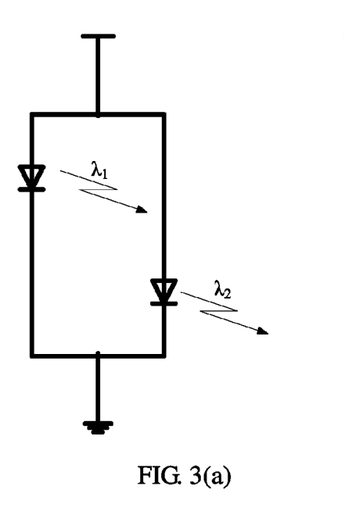
FIG. 3(a) is a schematic composition diagram of Embodiment 1 of an optical source according to an embodiment of the present disclosure.

As shown in FIG. 3(a), the optical source includes two single-wavelength lasers, and the two lasers respectively emit light having different wavelengths, where the wavelengths of the emitted optical signals are respectively $\lambda_1$ and $\lambda_2$.

Figure 3B:
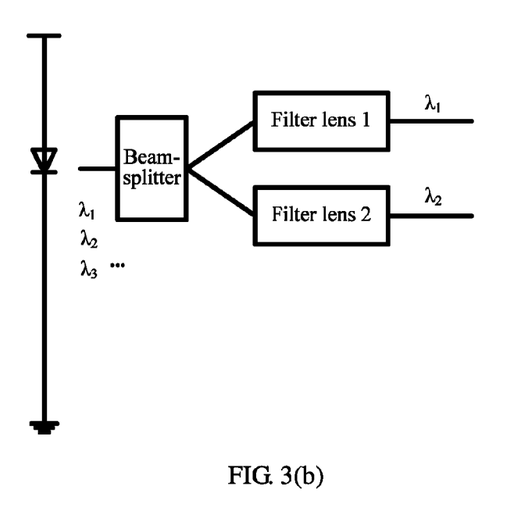
FIG. 3(b) is a schematic composition diagram of Embodiment 2 of an optical source according to an embodiment of the present disclosure.

As shown in FIG. 3(b), the optical source including one multi-wavelength laser obtains two channels of optical signals using a beam-splitter and then obtains, using two filter lenses whose working wavelengths are respectively $\lambda_1$ and $\lambda_2$, the two channels of optical signals whose wavelengths are respectively $\lambda_1$ and $\lambda_2$.

The optical multiplexer 212 is configured to perform multiplex processing on the two channels of optical signals that are obtained by the optical source 211 through processing and whose wavelengths are respectively $\lambda_1$ and $\lambda_2$, so as to obtain one channel of optical signal.

Implementation manners of the input end 213 for a to-be-modulated electrical signal and the optical modulator 214 in this embodiment are respectively the same as those of the input end 130 for a to-be-modulated electrical signal and the optical modulator 140 in the previous embodiment.

The optical sending unit 215 is configured to send the two channels of modulated optical differential signals to the optical transmission media.

For the two channels of optical signals that are generated by the optical source and whose wavelengths are respectively $\lambda_1$ and $\lambda_2$, the wavelengths need to meet the following constraint conditions.

Figure 4A:
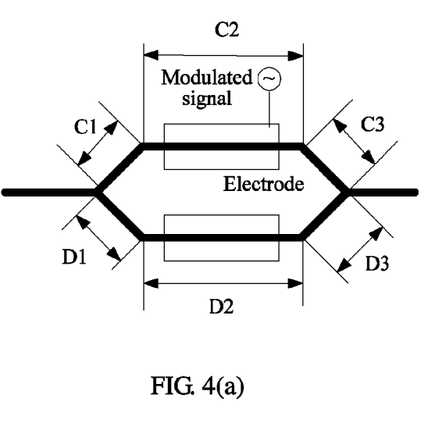
FIG. 4(a) is a schematic composition diagram of Embodiment 1 of an optical modulator according to an embodiment of the present disclosure.

(1) Referring to FIG. 4(a), FIG. 4(a) is a schematic structural diagram of an MZI modulator, where $L_1 = C_1 + C_2 + C_3$ is a length of an upper arm of the modulator;

$L_2 = D_1 + D_2 + D_3$ is a length of a lower arm of the modulator;

$\Delta\Phi$ is a variation between phase differences, between the two arms, existing when a modulated electrical input signal applied in the MZI modulator is at a high level and a low level, and during a specific implementation process, once the MZI modulator is determined, $\Delta\Phi$ is a determined value; and n is an effective refractive index of a waveguide in the MZI modulator, and n>1.

Based on this, when the MZI modulator is used, the wavelengths $\lambda_1$ and $\lambda_2$ of the two channels of optical signals meet the following constraint relationships:

$$2\pi n * \frac{|L_1 - L_2|}{(2k+1)\pi - \frac{\Delta\Phi}{2}} < \lambda_1 < 2\pi n * \frac{|L_1 - L_2|}{2k\pi - \frac{\Delta\Phi}{2}}, \text{ and}$$

$$2\pi n * \frac{|L_1 - L_2|}{2k\pi - \frac{\Delta\Phi}{2}} < \lambda_2 < 2\pi n * \frac{|L_1 - L_2|}{(2k-1)\pi - \frac{\Delta\Phi}{2}},$$

where k is an integer, and k≥1.

Figure 4B:
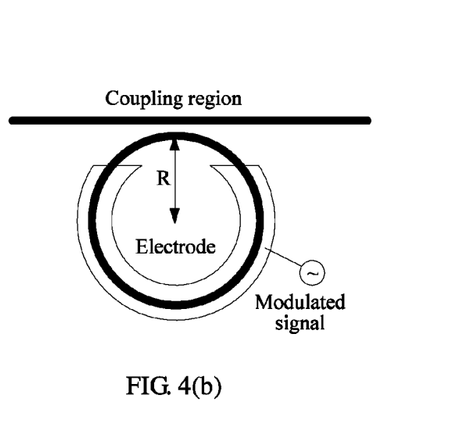
FIG. 4(b) is a schematic composition diagram of Embodiment 2 of an optical modulator according to an embodiment of the present disclosure.

(2) Referring to FIG. 4(b), FIG. 4(b) is a schematic structural diagram of a micro-ring resonant modulator, where R is a radius of a circle in which a micro-ring of the modulator is located;

n is an effective refractive index of a waveguide in the micro-ring resonant modulator, and n>1; and $\Delta\Phi$ is a variation between phases, in the micro-ring, existing when a modulated electrical input signal applied in the micro-ring resonant modulator is at a high level and a low level, and during a specific implementation process, once the micro-ring resonant modulator is determined, $\Delta\Phi$ is also a determined value.

Based on this, when the micro-ring resonant modulator is used, the wavelengths $\lambda_1$ and $\lambda_2$ of the two channels of optical signals meet the following constraint relationships:

$$2\pi n * \frac{2\pi R}{\left(2k\pi - \frac{\Delta\Phi}{2}\right)} < \lambda_1 < 2\pi n * \frac{2\pi R}{(2k-1)\pi - \frac{\Delta\Phi}{2}}, \text{ and}$$

$$2\pi n * \frac{2\pi R}{(2k+1)\pi - \frac{\Delta\Phi}{2}} < \lambda_2 < 2\pi n * \frac{2\pi R}{2k\pi - \frac{\Delta\Phi}{2}},$$

where k is an integer, and k≥1.

The optical transmission media 230 in FIG. 2 may be a fiber or an optical waveguide, so that the optical differential signals obtained through modulation are transmitted in the optical transmission media 230.

In FIG. 2, the receive end 220 includes: an optical receiving unit 224, an optical demultiplexer 221, an optical detector 222, and a comparator 223.

The optical receiving unit 224 is configured to receive the two channels of modulated optical differential signals that are transmitted by the optical transmission media.

An implementation manner of the optical demultiplexer 221 is the same as that of the optical demultiplexer 150 in the previous embodiment, which is not described herein again.

The optical detector 222 is configured to perform optical-to-electrical conversion separately on the two channels of optical signals whose wavelengths are $\lambda_1$ and $\lambda_2$, to obtain two channels of electrical signals.

During a specific implementation process, the optical detector 222 includes two photoelectric detectors, and the two photoelectric detectors respectively perform optical-to-electrical conversion on the two channels of optical signals whose wavelengths are $\lambda_1$ and $\lambda_2$.

The comparator 223 is configured to perform a differential operation on the two channels of electrical signals output by the optical detector 222, to obtain signals that are finally output.

Figure 5:
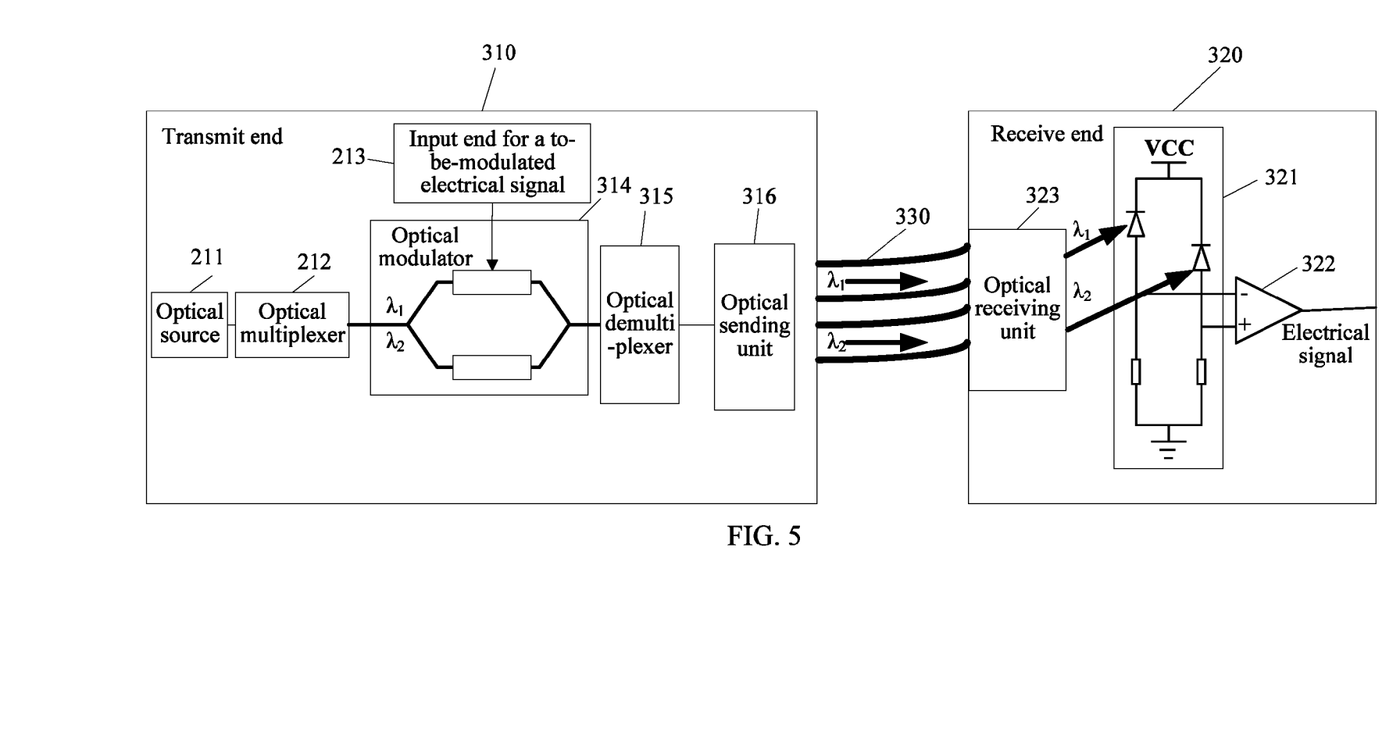
FIG. 5 is a schematic composition diagram of Embodiment 2 of an optical differential signal transmission system according to an embodiment of the present disclosure.

FIG. 5 shows another embodiment of an optical differential signal transmission system. A difference from the embodiment shown in FIG. 2 is that an optical demultiplexer 315 is moved to and implemented at a transmit end 310, that is, an optical modulator 314 in the transmit end 310 performs, using the optical demultiplexer 315, optical de-multiplex processing on two channels of optical differential signals obtained through modulation, to obtain two channels of optical signals, and the two channels of optical signals that have undergone optical de-multiplex processing are transmitted through two optical transmission media 330 to a receive end 320 using an optical sending unit 316. It should be noted that the optical transmission media 330 may be implemented using a fiber or an optical waveguide. The receive end 320 includes an optical receiving unit 323, an optical detector 321, and a comparator 322.

The optical receiving unit 323 is configured to receive two channels of separated optical differential signals from the optical transmission media 330.

It should be noted that there are two optical sending units 316 and two optical receiving units 323 in FIG. 5, that is, optical differential signals whose wavelengths are $\lambda_1$ and $\lambda_2$ are separately sent and received. For convenience of drawing, only one optical sending unit 316 and one optical receiving unit 323 are drawn in FIG. 5.

The optical detector 321 is configured to perform, using two photoelectric detectors, optical-to-electrical conversion separately on the two received channels of optical differential signals whose wavelengths are $\lambda_1$ and $\lambda_2$, to obtain two channels of electrical signals.

The comparator 322 is configured to perform a differential operation on the two channels of electrical signals output by the optical detector 321, to obtain electrical signals that are finally output.

Figure 6:
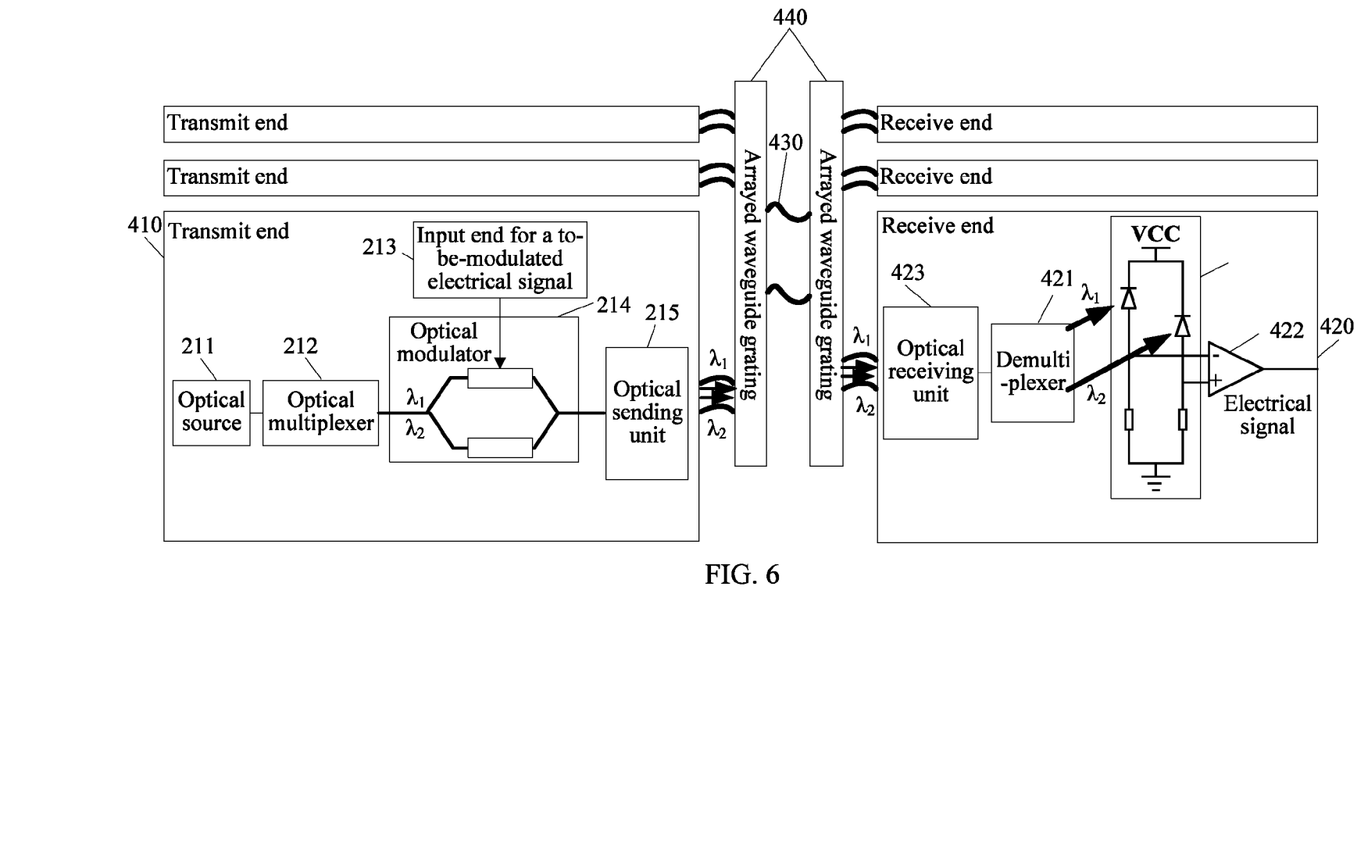
FIG. 6 is a schematic composition diagram of Embodiment 3 of an optical differential signal transmission system according to an embodiment of the present disclosure.

FIG. 6 shows another embodiment of an optical differential signal transmission system, which is applied in a wavelength division multiplexing (WDM) system. Multiple transmit ends separately couple, using an arrayed waveguide grating (AWG), optical differential signals obtained through optical modulation into a same fiber or optical waveguide, to implement wavelength division multiplexing. That is, the optical differential signal transmission system shown in FIG. 6 processes n originally transmitted optical signals having different wavelengths, to obtain 2n optical differential signals having different wavelengths. At a receive end, these optical signals having different wavelengths can also be separated using an arrayed waveguide grating.

It can be understood that in the system in which there are multiple transmit ends and multiple receive ends shown in FIG. 6, at a receive end 420, an optical demultiplexer 421 may also be moved to and implemented at a transmit end 410, so that the optical demultiplexer performs, at the transmit end 410, de-multiplex processing on two channels of differential signals, to obtain two channels of optical signals whose wavelengths are respectively $\lambda_1$ and $\lambda_2$, and then sends the two channels of optical signals to an arrayed waveguide grating 440 using two optical transmission media.

According to the foregoing embodiment, optical modulation is performed separately on two optical signals having different wavelengths using a to-be-transmitted electrical signal, to obtain two channels of optical differential signals, the two channels of optical differential signals are sent to a receive end using optical transmission media, and electrical signals finally output are obtained at the receive end using an optical detector and a comparator. According to the foregoing implementation manner, anti-interference performance of an optical signal can be effectively improved during a transmission process, thereby improving quality of signal transmission.

When two channels of optical differential signals whose wavelengths are respectively $\lambda_1$ and $\lambda_2$ are transmitted in different optical transmission media (for example, a fiber and an optical waveguide) or in same optical transmission media (fibers or optical waveguides), because refractive indexes of optical signals having different wavelengths in same optical transmission media or different optical transmission media are different, transmission speeds of the two channels of optical differential signals are different in the optical transmission media. Therefore, to avoid a possible dispersion problem, an optical buffer may be added at a receive end corresponding to one channel of optical signal whose refractive index is smaller. A specific implementation manner is as follows: the two channels of optical differential signals are separately transmitted using two fibers or optical waveguides. Assuming that refractive indexes of two wavelengths corresponding to the two fibers or optical waveguides are respectively $n_1$ and $n_2$ (n1<n2) and lengths of the fibers or optical waveguides between the receive end and the transmit end are d, a time difference for the two channels of optical differential signals to arrive at the receive end is:

$$T = d * \frac{n_2 - n_1}{C},$$

where C is a transmission speed of light.

Based on the forgoing calculation, an optical buffer technology needs to be used on an optical channel including a transmission medium of an optical differential signal whose refractive index is smaller, so that the channel of optical differential signal is delayed for a time period T. A specific optical buffer technology belongs to the prior art, which is not described herein again in the present disclosure.

Figure 7:
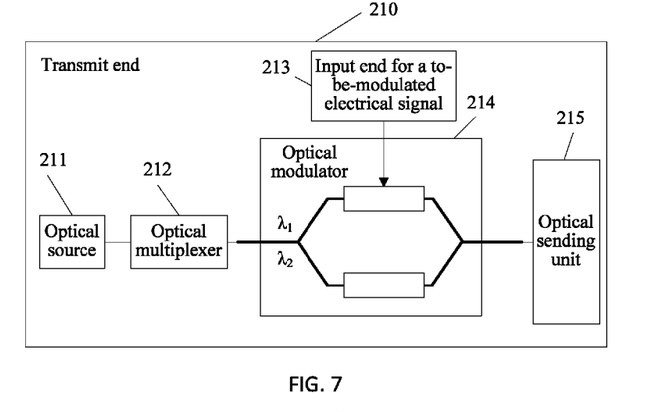
FIG. 7 is a schematic composition diagram of Embodiment 1 of a transmit end of an optical differential signal according to an embodiment of the present disclosure.

The present disclosure further provides Embodiment 1 of an optical differential signal sending apparatus, as shown in FIG. 7. Because the sending apparatus is already described in the foregoing optical differential signal transmission system, details are not described herein again.

Figure 8:
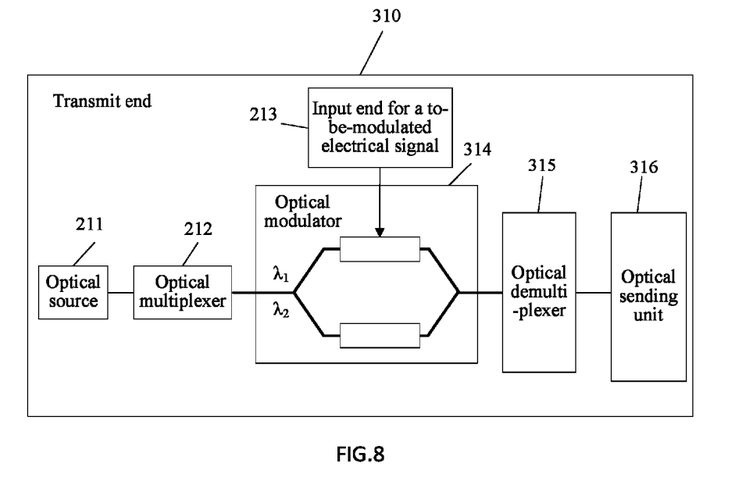
FIG. 8 is a schematic composition diagram of Embodiment 2 of a transmit end of an optical differential signal according to an embodiment of the present disclosure.

The present disclosure further provides Embodiment 2 of an optical differential signal sending apparatus, as shown in FIG. 8. Because the sending apparatus is already described in the foregoing optical differential signal transmission system, details are not described herein again.

Figure 9:
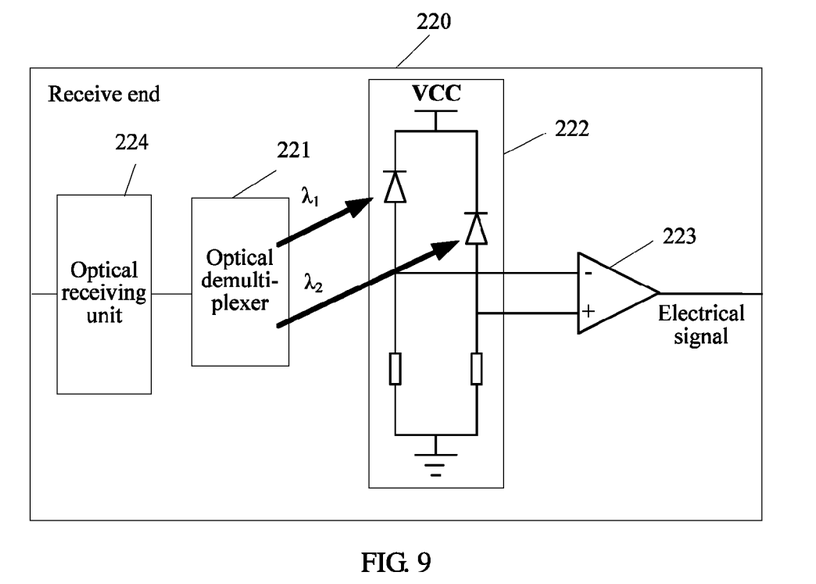
FIG. 9 is a schematic composition diagram of Embodiment 1 of a receive end of an optical differential signal according to an embodiment of the present disclosure.

In addition, the present disclosure further provides Embodiment 1 of an optical differential signal receiving apparatus, as shown in FIG. 9. Because the receiving apparatus is already described in the foregoing optical differential signal transmission system, details are not described herein again.

Figure 10:
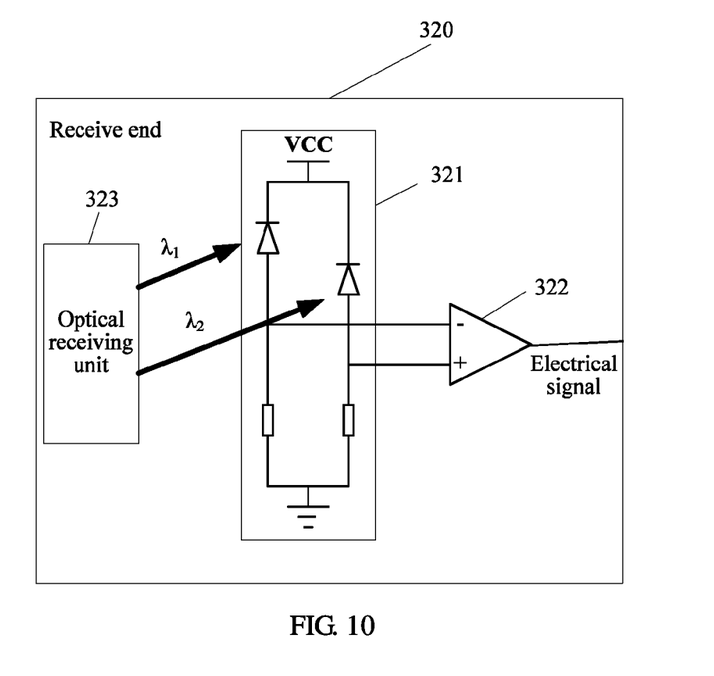
FIG. 10 is a schematic composition diagram of Embodiment 2 of a receive end of an optical differential signal according to an embodiment of the present disclosure.

In addition, the present disclosure further provides Embodiment 2 of an optical differential signal receiving apparatus, as shown in FIG. 10. Because the receiving apparatus is already described in the foregoing optical differential signal transmission system, details are not described herein again.

Figure 11:
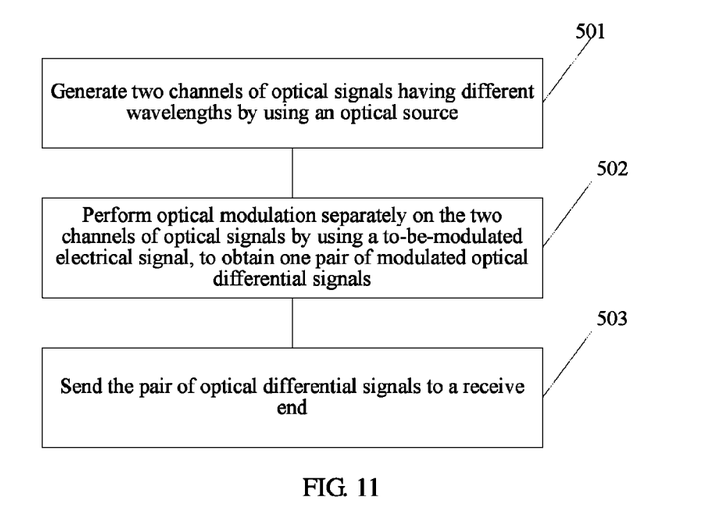
FIG. 11 is a schematic composition diagram of an embodiment of an optical differential signal sending method according to an embodiment of the present disclosure.

In addition, the present disclosure further provides an embodiment of an optical differential signal sending method. Referring to FIG. 11, a process of the method is as follows:

501: Generate two channels of optical signals having different wavelengths using an optical source, where the wavelengths are respectively $\lambda_1$ and $\lambda_2$, and $\lambda_1 \neq \lambda_2$.

502: Perform optical modulation separately on the two channels of optical signals using a to-be-modulated electrical signal, to obtain two channels of modulated optical differential signals.

503: Send the two channels of optical differential signals to a receive end.

Optical modulation is performed on the to-be-modulated electrical signal using a Mach-Zehnder interferometer MZI modulator or a micro-ring resonant modulator.

When optical modulation is performed on the to-be-modulated electrical signal using the MZI modulator, $\lambda_1$ and $\lambda_2$ meet the following constraint conditions:

$$2\pi n * \frac{|L_1 - L_2|}{(2k+1)\pi - \frac{\Delta\Phi}{2}} < \lambda_1 < 2\pi n * \frac{|L_1 - L_2|}{2k\pi - \frac{\Delta\Phi}{2}}, \text{ and}$$

$$2\pi n * \frac{|L_1 - L_2|}{2k\pi - \frac{\Delta\Phi}{2}} < \lambda_2 < 2\pi n * \frac{|L_1 - L_2|}{(2k-1)\pi - \frac{\Delta\Phi}{2}},$$

where $L_1$ and $L_2$ are respectively lengths of two arms of the MZI modulator, $\Delta\Phi$ is a variation between phase differences, between the two arms, existing when a modulated electrical input signal applied in the MZI modulator is at a high level and a low level, n is an effective refractive index of a waveguide in the MZI modulator, n>1, k is an integer, and k≥1.

when optical modulation is performed on the to-be-modulated electrical signal using the micro-ring resonant modulator, $\lambda_1$ and $\lambda_2$ meet the following constraint conditions:

$$2\pi n * \frac{2\pi R}{\left(2k\pi - \frac{\Delta\Phi}{2}\right)} < \lambda_1 < 2\pi n * \frac{2\pi R}{(2k-1)\pi - \frac{\Delta\Phi}{2}}, \text{ and}$$

$$2\pi n * \frac{2\pi R}{(2k+1)\pi - \frac{\Delta\Phi}{2}} < \lambda_2 < 2\pi n * \frac{2\pi R}{2k\pi - \frac{\Delta\Phi}{2}},$$

where R is a radius of a micro-ring in the micro-ring resonant modulator, n is an effective refractive index of a waveguide in the micro-ring resonant modulator, n>1, $\Delta\Phi$ is a variation between phases, in the micro-ring, existing when a modulated electrical input signal applied in the micro-ring resonant modulator is at a high level and a low level, k is an integer, and k≥1.

The foregoing method embodiment further includes: performing de-multiplex processing on the two channels of optical differential signals that are obtained by the optical modulator, to obtain two channels of separated optical differential signals; and transmitting, by using two transmission media, the two channels of optical differential signals obtained after de-multiplex processing.

Figure 12:
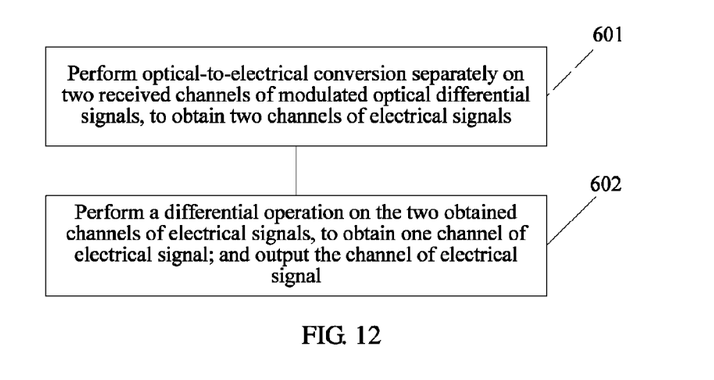
FIG. 12 is a schematic composition diagram of an embodiment of an optical differential signal receiving method according to an embodiment of the present disclosure.

The present disclosure further provides an embodiment of an optical differential signal receiving method. Referring to FIG. 12, the method includes:

601: Perform optical-to-electrical conversion separately on two received channels of modulated optical differential signals, to obtain two channels of electrical signals.

602: Perform a differential operation on the two obtained channels of electrical signals, to obtain one channel of electrical signal; and output the channel of electrical signal.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present disclosure.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific embodiments of the present disclosure, but are not intended to limit the protection scope of the present disclosure. Any modification or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. An optical differential signal transmission system, comprising:
   a transmit end;
   an optical transmission media; and
   a receive end;
   wherein the transmit end comprises:
      an optical source, configured to generate two channels of optical signals having different wavelengths, wherein the wavelengths are respectively $\lambda_1$ and $\lambda_2$, and $\lambda_1 \neq \lambda_2$;
      an input end for a to-be-modulated electrical signal, configured to input a to-be-modulated electrical signal;
      a unique optical modulator, configured to perform optical modulation separately on the two channels of optical signals having different wavelengths using the to-be-modulated electrical signal, to obtain two channels of modulated optical differential signals; and
      an optical transmitter, configured to send the two channels of modulated optical differential signals to the optical transmission media;
   wherein the optical transmission media is connected to the transmit end and the receive end, and is configured to transmit the two channels of modulated optical differential signals; and
   wherein the receive end comprises:
      an optical receiver, configured to receive the two channels of modulated optical differential signals that are transmitted by the optical transmission media;
      an optical detector, configured to perform optical-to-electrical conversion separately on the two channels of modulated optical differential signals that are received by the optical receiver, to obtain two channels of electrical signals; and
      a comparator, configured to perform a differential operation on the two channels of electrical signals obtained by the optical detector, to obtain a channel of electrical signal; and output the channel of electrical signal.

2. The transmission system according to claim 1, wherein the unique optical modulator is an MZI modulator, $\lambda_1$ and $\lambda_2$ and meet the following conditions:

$$2\pi n * \frac{|L_1 - L_2|}{(2k+1)\pi - \frac{\Delta\Phi}{2}} < \lambda_1 < 2\pi n * \frac{|L_1 - L_2|}{2k\pi - \frac{\Delta\Phi}{2}}, \text{ and}$$

$$2\pi n * \frac{|L_1 - L_2|}{2k\pi - \frac{\Delta\Phi}{2}} < \lambda_2 < 2\pi n * \frac{|L_1 - L_2|}{(2k-1)\pi - \frac{\Delta\Phi}{2}},$$

wherein $L_1$ and $L_2$ are respectively lengths of two arms of the MZI modulator, $\Delta\Phi$ is a variation between phase differences between the two arms of the MZI modulator existing when a modulated electrical input signal applied in the MZI modulator is at a high level and a low level, n is an effective refractive index of a waveguide in the MZI modulator, n>1, k is an integer, and $k \geq 1$.

3. The transmission system according to claim 1, wherein the unique optical modulator is a micro-ring resonant modulator, $\lambda_1$ and $\lambda_2$ and meet the following conditions:

$$2\pi n * \frac{2\pi R}{\left(2k\pi - \frac{\Delta\Phi}{2}\right)} < \lambda_1 < 2\pi n * \frac{2\pi R}{(2k-1)\pi - \frac{\Delta\Phi}{2}}, \text{ and}$$

$$2\pi n * \frac{2\pi R}{(2k+1)\pi - \frac{\Delta\Phi}{2}} < \lambda_2 < 2\pi n * \frac{2\pi R}{2k\pi - \frac{\Delta\Phi}{2}},$$

wherein R is a radius of a micro-ring in the micro-ring resonant modulator, n is an effective refractive index of a waveguide in the micro-ring resonant modulator, n>1, $\Delta\Phi$ is a variation between phases in the micro-ring existing when a modulated electrical input signal applied in the micro-ring resonant modulator is at a high level and a low level, k is an integer, and $k \geq 1$.

4. The transmission system according to claim 1, wherein the optical source comprises:
   a multi-wavelength laser, configured to obtain two channels of optical signals using a beam-splitter, and obtain the two channels of optical signals whose wavelengths are $\lambda_1$ and $\lambda_2$ using two filter lenses for processing, wherein output wavelengths of the two filter lenses are respectively $\lambda_1$ and $\lambda_2$.

5. The transmission system according to claim 1, wherein:
   the transmit end further comprises an optical demultiplexer, connected to the unique optical modulator and configured to perform de-multiplex processing on the two channels of modulated optical differential signals that are obtained by the unique optical modulator, to obtain two channels of separated optical differential signals;
   the optical transmitter is configured to send the two channels of separated optical differential signals to the optical transmission media; and
   the optical transmission media comprises two transmission media, respectively configured to transmit the two channels of separated optical differential signals.

6. The transmission system according to claim 4, wherein the transmit end further comprises:
   an optical multiplexer, connected to the optical source and configured to obtain a channel of optical signal by performing multiplex processing on the two channels of optical signals that are generated by the optical source and whose wavelengths are respectively $\lambda_1$ and $\lambda_2$, and send the obtained channel of optical signal to the unique optical modulator.

7. The transmission system according to claim 5, further comprising:
   an optical buffer, connected to the optical detector and configured to perform optical buffering on an optical differential signal, whose transmission speed is faster in the optical transmission media, of the two channels of separated optical differential signals, and send the optical differential signal on which optical buffering processing has been performed and an other optical differential signal of the two channels of separated optical differential signals to the optical detector.

8. An apparatus, comprising:
   an optical source, configured to generate two channels of optical signals having different wavelengths, wherein the wavelengths are respectively $\lambda_1$ and $\lambda_2$, and $\lambda_1 \neq \lambda_2$;

an input end for a to-be-modulated electrical signal, configured to input a to-be-modulated electrical signal;

a unique optical modulator, configured to perform optical modulation separately on the two channels of optical signals having different wavelengths using the to-be-modulated electrical signal, to obtain two channels of modulated optical differential signals; and an optical transmitter, configured to send the two channels of modulated optical differential signals.

9. The apparatus according to claim 8, wherein the unique optical modulator is an MZI modulator, $\lambda_1$ and $\lambda_2$ and meet the following conditions:

$$2\pi n * \frac{|L_1 - L_2|}{(2k+1)\pi - \frac{\Delta\Phi}{2}} < \lambda_1 < 2\pi n * \frac{|L_1 - L_2|}{2k\pi - \frac{\Delta\Phi}{2}}, \text{and}$$

$$2\pi n * \frac{|L_1 - L_2|}{2k\pi - \frac{\Delta\Phi}{2}} < \lambda_2 < 2\pi n * \frac{|L_1 - L_2|}{(2k-1)\pi - \frac{\Delta\Phi}{2}},$$

wherein $L_1$ and $L_2$ are respectively lengths of two arms of the MZI modulator, $\Delta\Phi$ is a variation between phase differences between the two arms existing when a modulated electrical input signal applied in the MZI modulator is at a high level and a low level, n is an effective refractive index of a waveguide in the MZI modulator, n≥1, k is an integer, and k≥1.

10. The apparatus according to claim 8, wherein the unique optical modulator is a micro-ring resonant modulator, $\lambda_1$ and $\lambda_2$ and meet the following conditions:

$$2\pi n * \frac{2\pi R}{\left(2k\pi - \frac{\Delta\Phi}{2}\right)} < \lambda_1 < 2\pi n * \frac{2\pi R}{(2k-1)\pi - \frac{\Delta\Phi}{2}}, \text{and}$$

$$2\pi n * \frac{2\pi R}{(2k+1)\pi - \frac{\Delta\Phi}{2}} < \lambda_2 < 2\pi n * \frac{2\pi R}{2k\pi - \frac{\Delta\Phi}{2}},$$

wherein R is a radius of a micro-ring in the micro-ring resonant modulator, n is an effective refractive index of a waveguide in the micro-ring resonant modulator, n≥1, $\Delta\Phi$ is a variation between phases in the micro-ring existing when a modulated electrical input signal applied in the micro-ring resonant modulator is at a high level and a low level, k is an integer, and k≥1.

11. The apparatus according to claim 8, wherein the optical source comprises:

a multi-wavelength laser, configured to obtain two channels of optical signals using a beam-splitter, and to obtain the two channels of optical signals whose wavelengths are $\lambda_1$ and $\lambda_2$ using two filter lenses for processing, wherein output wavelengths of the two filter lenses are respectively $\lambda_1$ and $\lambda_2$.

12. The apparatus according to claim 8, further comprising an optical demultiplexer, connected to the unique optical modulator, and configured to perform de-multiplex processing on the two channels of modulated optical differential signals that are obtained by the unique optical modulator, and to obtain two channels of separated optical differential signals;

wherein the optical transmitter is configured to send the two channels of separated optical differential signals.

13. The apparatus according to claim 11, further comprising:

an optical multiplexer, connected to the optical source and configured to perform multiplex processing on the two channels of optical signals that are generated by the optical source and whose wavelengths are respectively $\lambda_1$ and $\lambda_2$, and to send one obtained channel of optical signal to the unique optical modulator.

14. A method, comprising:

generating two channels of optical signals having different wavelengths using an optical source, wherein the wavelengths are respectively $\lambda_1$ and $\lambda_2$, and $\lambda_1 \neq \lambda_2$;

performing optical modulation with a unique optical modulator on the two channels of optical signals using a to-be-modulated electrical signal, to obtain two channels of modulated optical differential signals; and sending the two channels of optical differential signals to a receive end.

15. The method according to claim 14, wherein optical modulation is performed on the to-be-modulated electrical signal using an MZI modulator, $\lambda_1$ and $\lambda_2$ and meet the following conditions:

$$2\pi n * \frac{|L_1 - L_2|}{(2k+1)\pi - \frac{\Delta\Phi}{2}} < \lambda_1 < 2\pi n * \frac{|L_1 - L_2|}{2k\pi - \frac{\Delta\Phi}{2}}, \text{and}$$

$$2\pi n * \frac{|L_1 - L_2|}{2k\pi - \frac{\Delta\Phi}{2}} < \lambda_2 < 2\pi n * \frac{|L_1 - L_2|}{(2k-1)\pi - \frac{\Delta\Phi}{2}},$$

wherein $L_1$ and $L_2$ are respectively lengths of two arms of the MZI modulator, $\Delta\Phi$ is a variation between phase differences between the two arms existing when a modulated electrical input signal applied in the MZI modulator is at a high level and a low level, n is an effective refractive index of a waveguide in the MZI modulator, n>1, k is an integer, and k≥1.

16. The method according to claim 14, wherein optical modulation is performed on the to-be-modulated electrical signal using a micro-ring resonant modulator, and $\lambda_1$ and $\lambda_2$ meet the following conditions:

$$2\pi n * \frac{2\pi R}{\left(2k\pi - \frac{\Delta\Phi}{2}\right)} < \lambda_1 < 2\pi n * \frac{2\pi R}{(2k-1)\pi - \frac{\Delta\Phi}{2}}, \text{and}$$

$$2\pi n * \frac{2\pi R}{(2k+1)\pi - \frac{\Delta\Phi}{2}} < \lambda_2 < 2\pi n * \frac{2\pi R}{2k\pi - \frac{\Delta\Phi}{2}},$$

wherein R is a radius of a micro-ring in the micro-ring resonant modulator, n is an effective refractive index of a waveguide in the micro-ring resonant modulator, n>1, $\Delta\Phi$ is a variation between phases in the micro-ring existing when a modulated electrical input signal applied in the micro-ring resonant modulator is at a high level and a low level, k is an integer, and k≥1.

17. The method according to claim 14, further comprising:

performing de-multiplex processing on the two channels of modulated optical differential signals, to obtain two channels of separated optical differential signals, and sending the two channels of separated optical differential signals.

* * * * *

UNITED STATES PATENT AND TRADEMARK OFFICE
CERTIFICATE OF CORRECTION

PATENT NO. : 9,882,650 B2
APPLICATION NO. : 15/189719
DATED : January 30, 2018
INVENTOR(S) : Luo et al.

It is certified that error appears in the above-identified patent and that said Letters Patent is hereby corrected as shown below:

In the Claims

In Column 15, Lines 49-50, Claim 2, delete "$\lambda_1$ and $\lambda_2$ and meet the following conditions:" and insert --and $\lambda_1$ and $\lambda_2$ meet the following conditions:--.

In Column 16, Line 3, Claim 3, delete "$\lambda_1$ and $\lambda_2$ and meet the following conditions:" and insert --and $\lambda_1$ and $\lambda_2$ meet the following conditions:--.

In Column 17, Lines 11-12, Claim 9, delete "$\lambda_1$ and $\lambda_2$ and meet the following conditions:" and insert --and $\lambda_1$ and $\lambda_2$ meet the following conditions:--.

In Column 17, Line 29, Claim 9, delete "n≥1" and insert --$n > 1$--.

In Column 17, Line 32, Claim 10, delete "$\lambda_1$ and $\lambda_2$ and meet the following conditions:" and insert --and $\lambda_1$ and $\lambda_2$ meet the following conditions:--.

In Column 17, Line 45, Claim 10, delete "n≥1" and insert --$n > 1$--.

In Column 18, Lines 21-22, Claim 15, delete "$\lambda_1$ and $\lambda_2$ and meet the following conditions:" and insert --and $\lambda_1$ and $\lambda_2$ meet the following conditions:--.

Signed and Sealed this
Twenty-sixth Day of June, 2018

Andrei Iancu
*Director of the United States Patent and Trademark Office*